UNITED STATES PATENT OFFICE.

FREDERICK HAGEDORN, OF SAN FRANCISCO, CALIFORNIA.

MANUFACTURE OF MATTRESS-STUFFING.

SPECIFICATION forming part of Letters Patent No. 289,409, dated December 4, 1883.

Application filed August 10, 1883. (No specimens.)

*To all whom it may concern:*

Be it known that I, FREDERICK HAGEDORN, a citizen of the United States, residing at San Francisco, in the county of San Francisco and State of California, have invented certain new and useful Improvements in the Manufacture of Mattress-Stuffing, of which the following is a specification.

The fibers of the "soap-root" and the wild onion have heretofore been used in the manufacture of stuffing for mattresses; yet their use has been somewhat restricted, owing to their offensive smell and pale color, which prevented their use as a mixing with black hair, and the objects of my invention are to remove the offensive smell and to dye the fiber of a rich black color.

In order to accomplish these objects, I employ a series of tanks provided with pipes, through which live steam may be admitted for the purpose of raising the temperature of the contents of the tanks or vats. The first tank is made of iron, with a wooden lining throughout, and is provided with a false perforated wooden bottom. A perforated steam-pipe traverses the space between the true and false bottoms, and the bottom of the tank is provided with a tap-hole for drawing off the liquids when so desired. I now place in the tank about one hundred pounds of soap-root or wild-onion fiber and sprinkle it with a solution of chloride of lime, in about the proportion of four pounds of chloride of lime to ten gallons of hot water. When this batch of fiber has been sufficiently dampened, I then put in another batch of one hundred pounds and sprinkle that with the solution of chloride of lime, and so on until four or five hundred pounds of fiber have been placed within the tank. I then turn the steam on and steam the contents for about one hour, which will loosen the dirt upon the fibers and dispel all offensive smells or odors, and also imparts to the fiber a bright color or bleaches them. The mass of fiber will now be only slightly damp, and is run through the picker twice, and spun and curled into ropes and wound into coils, which are afterward steamed with live steam in a separate tank for three hours, and then dried. The fiber is now ready for the dyeing process, and let it be supposed that about two hundred and fifty pounds of fiber are to be treated. I first fill a tank having that capacity about two-thirds full of water, together with ten pounds of copperas. This tank is provided with a steam-pipe, which rests upon the bottom of the tank, and is provided with perforations for the escape of steam. I now turn on the steam and boil the contents of the tank for fifteen minutes, or until the copperas is thoroughly dissolved. With a block and tackle I then hoist into the tank a bundle of twenty coils of rope, and allow them to remain in the boiling copperas-water for fifteen minutes; then withdraw them and allow them to drain for a few minutes. They are then placed in the steam-tank, and they are steamed with live steam for three hours, when they are removed and placed in the drying-room. The fiber is now ready for market, and is of a gray color, and is more especially useful for upholstering and stuffing mattresses.

For coloring the fiber black for use in making brushes and mixing with short black hair, the operation of twisting the fiber into rope is dispensed with, as the fibers should be as straight as possible, and not curled.

In the same kind of a tank as that last described I boil ten pounds of logwood in ten gallons of water for every two hundred and fifty pounds of fiber to be treated. When the color of the logwood has been extracted, the fiber is then placed in the tank and boiled by steam for about half an hour, and then taken out with a pitchfork and placed in a copperas solution to set the color.

The quantity of the solution in the copperas tank should be sufficient to cover the fiber, and it should be boiled for half an hour, at the expiration of which time the fiber should be removed and rinsed in clear water, and then dried, when the product is ready for market.

Having thus described my invention, what I claim, and desire to secure by Letters Patent, is—

The process of cleansing, deodorizing, and dyeing the fibers of the soap-root and onion-plant by treating them with a solution of chloride of lime, and boiling them in a suitable tank with live steam, and then boiling the material in a solution of copperas or logwood to impart the desired color, in about the proportions and manner herein set forth and specified.

In testimony that I claim the foregoing I have hereunto set my hand and seal.

FREDERICK HAGEDORN. [L. S.]

Witnesses:
 WILMER BRADFORD,
 CHAS. E. KELLY.